United States Patent [19]

Miller et al.

[11] Patent Number: 4,545,396
[45] Date of Patent: Oct. 8, 1985

[54] SYSTEM FOR OPTIMUM IRRIGATING AND FERTILIZING

[76] Inventors: Richard N. Miller, 4407 Lake Trudy Dr., St. Cloud, Fla. 32769; K. Bruce Ray, 115 Orange Ave., Orlando, Fla. 32809

[21] Appl. No.: 705,750

[22] Filed: Feb. 25, 1985

[51] Int. Cl.[4] .......................................... F16K 17/36
[52] U.S. Cl. ................................... 137/78.3; 239/64; 239/69; 239/310
[58] Field of Search ............... 239/63, 64, 69, 310; 137/78.3

[56] References Cited

U.S. PATENT DOCUMENTS

| 3,669,357 | 6/1972 | Overbey | 239/310 |
| 4,176,395 | 11/1979 | Evelyn-Veere et al. | 239/69 |
| 4,209,131 | 6/1980 | Barash et al. | 239/69 |
| 4,396,149 | 8/1983 | Hirsch | 239/63 |
| 4,456,176 | 6/1984 | Agius | 239/310 |

FOREIGN PATENT DOCUMENTS 406518  6/1974  U.S.S.R. .................. 239/69

Primary Examiner—A. Michael Chambers
Attorney, Agent, or Firm—Macdonald J. Wiggins

[57] ABSTRACT

A system for groves, truck farms and the like for automatically irrigating and fertilizing in accordance with the requirements of the soil. A plurality of capacitance sensors are buried in the areas to be irrigated and fertilized. A computer periodically measures the equivalent capacitive reactance of each sensor to obtain an indication of soil moisture and the equivalent resistance of each sensor to obtain an indication of fertilizer levels in the soil. Water pumps and valves and liquid fertilizer pumps are controlled by the computer to operate only when the soil requires.

2 Claims, 3 Drawing Figures

SYSTEM FOR OPTIMUM IRRIGATING AND FERTILIZING

BACKGROUND OF THE INVENTION

1. Field of the Invention

The present invention relates to a system for automatically irrigating and fertilizing of agricultural operations such as groves, truck farms, and the like and more particularly to a computer control system in which feedback from moisture and salinity sensors is provided.

2. Description of the Prior Art

Irrigation and fertilizing of large agricultural operations is expensive and greatly affects the environment. There is a continuing demand to conserve ground water by more efficient irrigation and for a reduction in the pollution of these waters due to fertilizing. An additional economic benefit is achieved when the irrigation water is optimized, and the energy usage and proper amounts of fertilizer are optimized. In the past, it has been common to operate irrigation systems by timing devices which method does not take into account the actual need of the soil for moisture. There have been developed systems which utilize various types of buried sensors to determine when the soil requires irrigation. Typical of such apparatus are those in the following U.S. Pat. Nos.: Hasencamp 2,812,976; Higgins 2,611,643; Sears 3,961,753; and Neal 4,197,866. In general, these systems utilize an in-ground sensor or probe, a threshold device which will turn on the irrigation below a certain indicated moisture level and timers. However, the readings from commonly used moisture sensors are greatly influenced by the salinity of the soil as well as by the moisture. Therefore, the operation of such systems will be influenced by the operator' fertilizing schedule.

In co-pending patent application, Ser. No. 705,719, filed 2-25-85, the present inventors disclose a novel sensor which, when buried in the soil, will permit determination of the salinity level as well as the moisture level of the soil and will effectively separate these two factors.

SUMMARY OF THE INVENTION

The present invention is a system which utilizes a multiplicity of moisture and salinity sensors buried within the root zone of the crops and including means for measuring the complex impedance of the sensor in which the reactive part is a measure of the moisture content of the soil, and the resistive part is a measure of the salinity of the soil. A digital computer is utilized having a data bank which will store fixed parameters of the operation such as the nature of the soil, the crop requirements for fertilizer and moisture, meteorological data, and other information useful in control of irrigation and fertilizing.

In a typical installation, a main water pump is provided which supplies mains to the various distribution systems in the operation. In a large operation, the area would be divided into regions with sensors buried in each region so that the requirements can be determined individually for each region. When irrigation is needed by any region, the main pump is energized by means of control circuits operating from the computer. Manual override is also provided. From the main pump, the pipes delivering water to the individual areas are each controlled by solenoid type valves or the like. Preferably, modulating valves are used such that the rate at which the water is introduced may be controlled.

The multiple sensor lines coming into the computer are multiplexed and the impedance of each sensor individually calculated. From the sensors in a specific region, the requirement for water in any area can be determined and the supply valves adjusted to produce an irrigation rate which will be related to the allowable soil moisture depletion (SMD). The soil moisture depletion refers to that level of moisture at which it is determined that more moisture should be applied. The value of the soil moisture depletion figure has been determined experimentally for many varieties of crops. When the computer determines that the moisture content of the soil is below or approaching the allowable moisture depletion level, controls are initiated which turn on the water pumps and the valves for the pertinent areas. Generally, the sensors may be read at a suitable time interval such as 12 or 24 hours and the computer can predict when irrigation will be required from the last reading. During irrigation, the sensors are read at 15 minute intervals to permit discontinuance of watering when the required level is reached.

Once it is determined that irrigation is required and the pumps and required valves have been turned on, the computer will determine an irrigation duration which will be the time calculated, based on the soil content, to bring the soil up to the desired depletion level.

The data base of the computer may include statistical information and information on projected crop prices, the time of the year, long range weather forecasts, and similar factors which when properly evaluated will increase the efficiency of the system by utilizing this information as weighting factors in the control operation.

Also considered in the decisions as to whether to irrigate is the current precipitation. The system will be obtaining inputs from meteorological sensors and can determine if it is raining at the time of reading the sensors or whether rain has a high probability within the next 24 hours. These factors may be weighted to control irrigation or the rate of irrigation.

The sensors are also read to determine the salinity of the soil and to compare these readings with stored threshold levels to make the decision as to whether to fertilize. If fertilization is required, an injection pump is energized which injects liquid fertilizer into the irrigation water. From the readings of the sensors, the computer will determine the approximate levels of fertilizer required for the particular duration of irrigation. The control systems then control the amount of fertilizer injected into the irrigation system.

It is therefore a principal object of the invention to provide an automatic system for irrigating and fertilizing agricultural crops.

It is another object of the invention to provide a system having a multiplicity of buried moisture and salinity sensors whose outputs are analyzed by a computer to determine the moisture levels and the salinity levels of the soil in which each sensor is buried.

It is yet another object of the invention to provide a computer having a data base in which statistical data concerning the soil conditions, weather conditions, market prices, and similar relevant information is stored.

It is a further object of the invention to provide a system having electronic control circuits which serve to control the rate of flow of water in the various portions of an irrigation system and which control the injection of fertilizer into the water when fertilization is required.

These and other advantages and objects of the invention will become apparent from the following detailed description when read in conjunction with the drawings.

DETAILED DESCRIPTION OF THE PREFERRED EMBODIMENT

Figure 1:
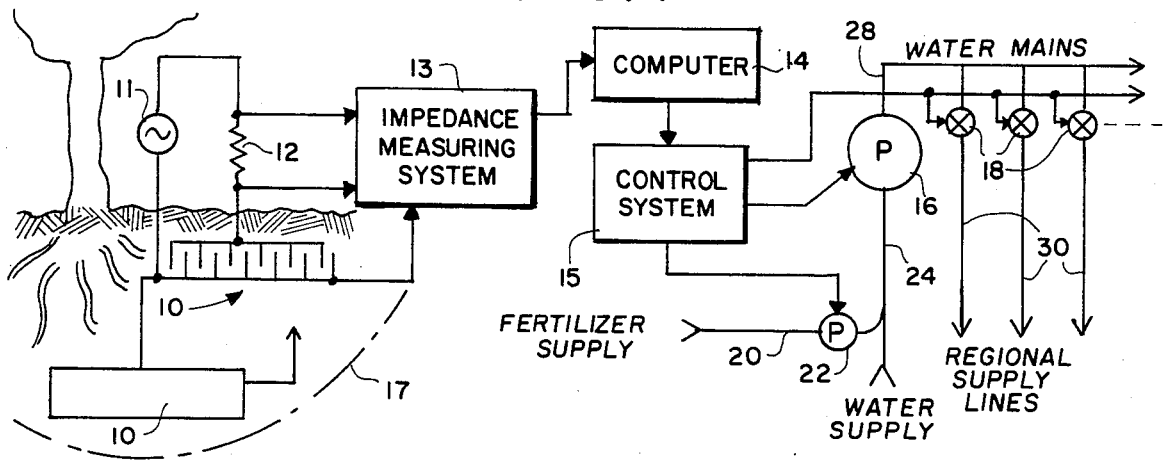
FIG. 1 is a simplified diagram of a sensor installation of the type used with the invention and a partial schematic view of the water and fertilizer supply systems.

An important element of the present invention is the sensor construction which provides the control information to the computer. In FIG. 1, a greatly simplified diagram illustrates the operation of the sensor 10 which is buried in the root zone 17 of a tree 19. Sensor 10 comprises two sets of metal plates interleaved such that the soil represents a dielectric between the plates. Therefore, the sensor will have a capacitance depending upon its size and of the dielectric constant of the soil. As indicated in FIG. 1, it is preferred that at least two sensors be buried at different depths to be able to differentiate a high moisture level from surface water from the overall soil moisture. For the purposes of explanation, only the operation of the upper sensor will be discussed. Here, a source of low frequency ac 11 is provided connected to sensor 10 via a sensing resistor 12. As will be understood, the current through sensor 10 may be measured by the voltage across resistor 12. An impedance measuring system 13 is provided and is connected to measure the current through sensor 10 and the voltage across sensor 10. From these data, the complex impedance of sensor 10 can be calculated by computer 14 which calculates independently the reactive component of impedance and the resistive component of impedance.

It is well known that the capacitance is affected by the amount of moisture in the soil due to the high dielectric constant of water. The resistive component is affected mainly by the salinity of the soil or the amount of dissolved minerals that occur in the water. Computer 14 will include stored data concerning the relationship between the salinity of the soil and the concentration of fertilizer in the soil. Thus, the control system 15 is operated by computer 14 to control main water pump 16 which provides water from supply line 24 to water mains 28. Control system 15 also operates modulated injection pump 22 which injects liquid fertilizer from a fertilizer supply into the water supply line 24. When this is done, the fertilizer is distributed along with the irrigation water. A plurality of regional supply lines 30 are fed from water mains 28 via modulated control valves 18. Control system 15 may then operate the individual control valves 18 as the various regions require irrigation.

Figure 2:
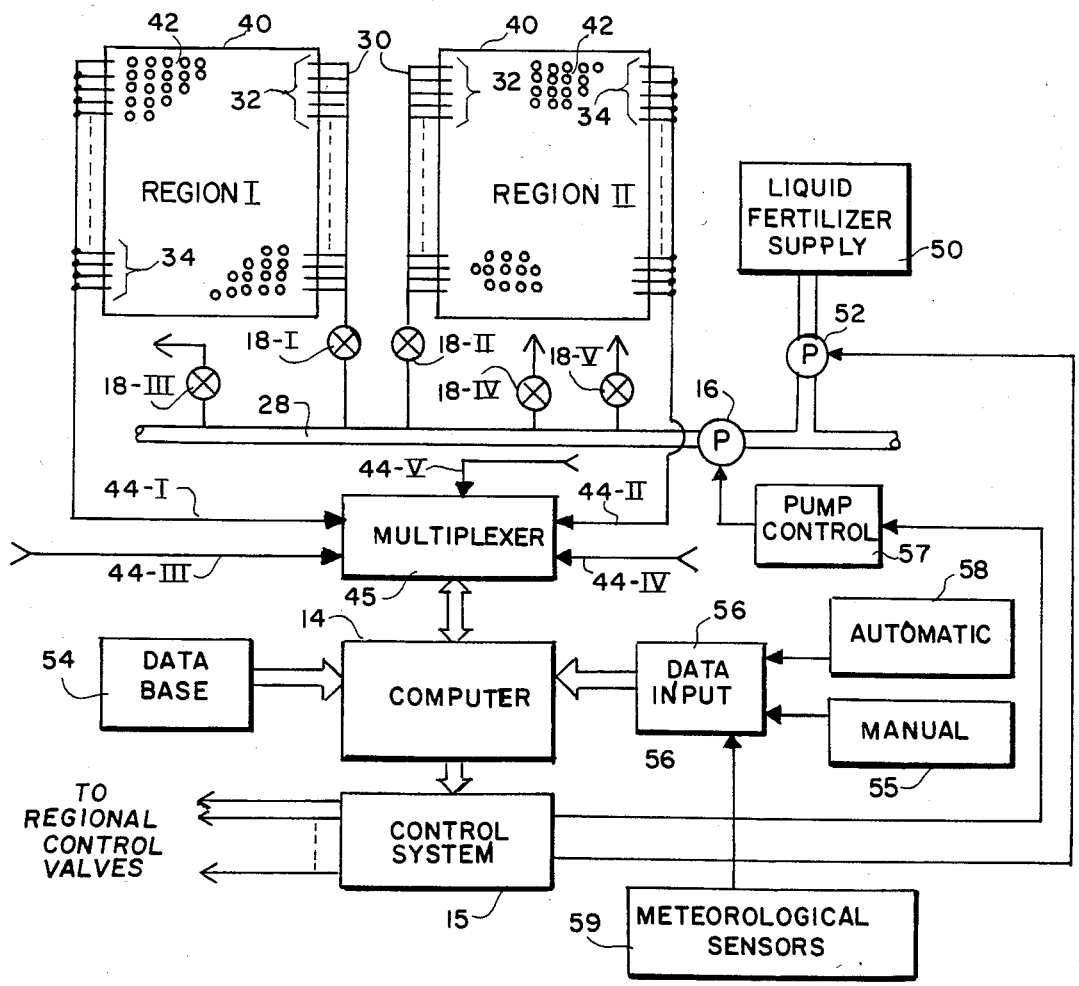
FIG. 2 is a block diagram of a multiregion agricultural system such as an orange grove showing in more detail the automatic irrigating and fertilizing system of the invention.

Turning now to FIG. 2, a more detailed block diagram of a typical installation used in conjunction with orange groves is shown. Here, it is assumed that the system is being used with an orange grove having a plurality of regions 40 in which each region may be independently irrigated and fertilized. Using Region I as an example, it consists of a grove of orange trees 42. Regional supply line 30 connects to water main 28 and feeds a plurality of lateral lines 32 which run down the rows of trees 42. It is common to have a sprinkler head adjacent each tree in the region. Not shown is a multiplicity of sensors buried within the root zones of the trees 42. The number of sensors can be determined from the topography and characteristics of the soil. Generally, several sets will be provided. These sensors are connected via leads 34 to a multi-conductor cable 44-I to multiplexer 45. Multiplexer 45 receives sensor inputs from the other regions via cables 44-II, III, IV and V. Multiplexer 45 is controlled by computer 14 to cycle through the sensors in region 1 during a time allocated for sensor readout as will be discussed hereinbelow. The computer may then compare the sensor readings of reactance and resistance to thresholds stored in data base 54 and may indicate to the system when irrigation and fertilization is required. Similarly, the computer checks the sensors in a region II portion of the grove 40 shown as well as in the other regions not shown. The computer makes its decisions as to when to start and stop irrigation and fertilizing based on the stored information in data base 54 which may be introduced via data input 56 from a variety of sources. Manual data can be introduced through a keyboard 55 or like means. Also, data may be obtained from meteorological sensors 59, which measure such factors as precipitation, temperature, relative humidity, and wind. Control subsystem 15 receives commands from computer 14 and will operate the main water pump 16 via its pump control 57, and, where required, will energize fertilizer pump 52 which injects fertilizer into water main 28 via pump 16.

Figure 3:
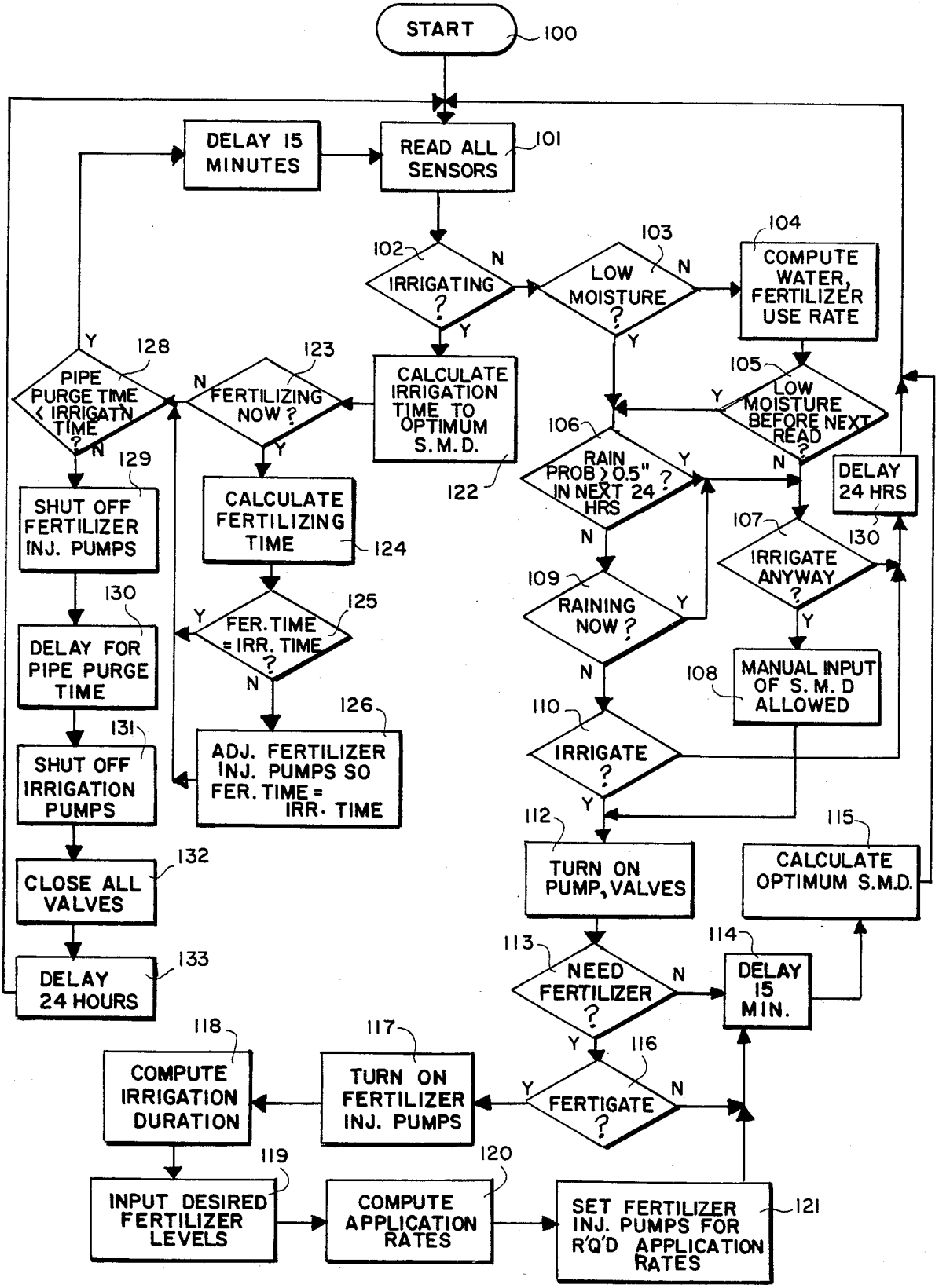
FIG. 3 is a functional flow diagram showing the various operations performed by the computer in operating the system of the invention.

Having described the structure of the system, the operation will be described with reference to FIG. 3. When the system is first turned on (100), computer 14 will request a reading from each sensor in the system. This includes not only the moisture and salinity sensors but also the meteorological sensors 59.

When all of the sensors are read (101), the computer checks to determine if the irrigation system is in operation (102). If it is not, the sensor will compare the reactance readings obtained for each sensor to a stored threshold level to determine if the moisture is unacceptably low (103) in any portion of the system. If there is no reading below the stored threshold, the computer will determine from its historical data the water and fertilizer use rates (104). It then extrapolates those rates to see if the threshold will be exceeded before the next sensor reading (105), which may be in 12 to 24 hours. If the answer is no, the operator of the system is given a choice whether to irrigate anyway (107). If not, a delay period (103), for example 24 hours, will be instituted and the sensors will not be read again until that period has expired. If moisture levels are below the desired threshold or if the computer calculates that the use rates will cause these thresholds to be exceeded before the next sensor reading, the meteorological information in the computer data base is examined to determine if there is a rain probability of less than 0.5 in the next 24 hours (106). If this appears likely, then irrigation may be delayed to take advantage of natural rainfall.

If there is no indication of rain in the next 24 hours and it is not presently raining (109), irrigation is indicated for the particular region having the below threshold reactance readings. The operator is given the option (110) to allow irrigation to proceed or to not irrigate. If not, the sensors are checked in 24 hours.

During the decision process as to whether to irrigate as a result of the last sensor readings, the operator may manually enter a soil moisture depletion level which is allowable to bring the moisture level up to a specific level. Normally, the computer will note the reactance reading which is below a stored threshold and will automatically turn on the water pumps and valves (112) affecting the dry areas after the cycle has given the human operator a change to intervene.

As irrigation commences, the computer compares the equivalent resistance readings of each sensor with its stored fertilizer thresholds (113) to determine if, during the irrigation, fertilizer is needed. If these checks show no below threshold fertilizer resistance readings, the computer introduces a sensor reading delay (114) which may be on the order of 15 minutes. As will be understood, the decision as to when and how much fertilizer to apply depends on many interrelated economic, climatic and meteorological factors. Therefore, the computer will calculate an optimum soil moisture depletion (115) which can be based on projected crop prices, time of the year, long range weather forecasts, and similar factors. In some cases, this optimum SMD may call for fertilizer if this will be economically advantageous or may delay fertilizing if there is no economic need for it. Thus, at the next 15 minute sensor reading, the modified threshold for fertilization will be applied.

If the sensor readings indicate the need to fertilize, this will be done automatically (116) unless the human operator intervenes. Known as "fertigation", fertilizing in the system of the invention involves injecting liquid fertilizer into the irrigation water. The computer turns on the fertilizer injector pumps (117), computes from the reactance readings approximately how long irrigation is expected to last (118) computes the required fertilizer application levels and rates (119, 120) and controls the fertilizer injector pumps to inject the fertilizer at the appropriate rate (121). The operator may manually enter certain desired fertilizer levels depending upon day to day conditions. As will be recognized, the system will, in 15 minutes, re-check the sensors of the areas in which irrigation and fertilizing is taking place so that the irrigation and fertilizing can be discontinued when the desired levels are reached. Advantageously, this prevents more fertilizer being added than the plants can utilize and which would otherwise tend to pollute the ground aquifer. Similarly, it prevents over watering which can cause damage to the crop roots, as well as a waste of money.

During the time that irrigation is taking place, and the sensors are read, the computer will calculate the time for the soil to reach the optimum SMD level (122). If during irrigation, an indication is received that fertilizing is necessary, the computer calculates from stored data the pipe purge time, defined as the time after shut-off of the fertilizer injector pumps that will be required to purge the irrigation pipes of fertilizer to a level that will not foster algae growth. If this pipe purge time is less than the irrigation time (128), then the system will continue in a 15 minute sensor reading cycle (127). However, if the pipe purge time is greater than the projected irrigation time which would result in leaving fertilizer residue in the distribution pipes, the computer will shutoff the fertilizer injector pumps (129) somewhat early in order to provide a delay for purging of the pipes prior to shutting off the irrigation pumps (131). After the irrigation SMD level is reached, all the valves are closed (132) and the 24 hour delay period begins (133) before the sensors will again be read.

If during irrigation, the system is also fertilizing (133), the computer will calculate the time of fertilization (124) to reach the desired fertilizer level and will look to see if this corresponds to the irrigation time (125). If it is not, then the fertilizer injector pumps will be adjusted to bring these two times into consonance (126).

It will be noted that the relatively long periods between the readings of the sensors results in the computer being active only a very small percentage of time. Thus, the computer may independently control each region of the grove or farm. The reading cycles for each region may be staggered and independently controlled. It is also quite common for one region to have significantly different soil conditions than another region and therefore the computer will maintain a separate data base for each of the regions. By the use of telemetry over telephone lines or other communication channels, the system of the invention makes it possible for an operator or foreman to control groves and farms over an extremely large area and to maintain close supervision of the operations.

Although a system has been shown in which a time sharing computer is utilized to control irrigation and fertilizing of a large number of agricultural operations, it will be understood that various modifications and changes in this arrangement can be made. For example, a common water and fertilizer system may be used with each region having its own microprocessor and data base, each operating independently. All such modifications are assumed to fall within the spirit and scope of the invention.

We claim:

1. A system for automatically irrigating and fertilizing soils of groves, truck farms and the like comprising:
  (a) a water supply system having
    (i) at least one main pump,
    (ii) a main supply line connected to said main pump,
    (iii) a plurality of lateral supply lines to the areas to be irrigated and fertilized, said lateral supply lines connected to said main supply line, and
    (iv) an electrically controllable valve disposed in each of said lateral supply lines;
  (b) an electrically controllable injector pump having an input connected to a source of liquid fertilizer and an output connected to the input of said main pump;
  (c) a multiplicity of capacitive sensors buried in the soils to be irrigated and fertilized such that said soil acts as a dielectric for said capacitive sensor; and
  (d) electronic measuring means connected to said capacitive sensors for measuring independently an equivalent reactance and an equivalent resistance of each of said capacitive sensors;
  (e) electronic control subsystem means connected to said electronic measuring means and having
    (i) stored threshold levels of reactance representative of a required minimum moisture level for said soils,
    (ii) stored threshold levels of resistance representative of a required minimum fertilizer levels for said soils,
    (iii) first comparator means for receiving reactance measurements from said electronic measurement means for producing a first control signal when said reactance is below a stored reactive threshold, (iv) second comparator means for receiving resistance measurements from said electronic measurement means for producing a second control signal when said resistance is below a stored resistance threshold, (v) first control circuit responsive to said first control signal to energize said main pump and to open required ones of said lateral supply line valves, and (vi) second control circuit responsive to said second control signal to energize said injector pump only if said main pump is energized.

2. The system as recited in claim 1 in which said electronic measurement means and said electronic control subsystem includes a digital computer having
 (a) a data base for storing soil data, crop data, weather data and marketing data;
 (b) a data input for entering data to said data base; and
 (c) calculating means for calculating water and fertilizer use rates, soil moisture depletion levels, fertilizing application rates and fertilizing times.

* * * * *